(12) United States Patent
Sharma et al.

(10) Patent No.: US 11,294,813 B2
(45) Date of Patent: Apr. 5, 2022

(54) SSD ADDRESS TABLE CACHE MANAGEMENT BASED ON PROBABILITY DISTRIBUTION

(71) Applicant: WESTERN DIGITAL TECHNOLOGIES, INC., San Jose, CA (US)

(72) Inventors: Avinash Sharma, Karnataka (IN); Rishi Gautam Mukhopadhyay, Karnataka (IN); Ravi Sharma, Karnataka (IN); Chetan Shivaji More, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/860,720

(22) Filed: Apr. 28, 2020

(65) Prior Publication Data

US 2021/0334217 A1  Oct. 28, 2021

(51) Int. Cl.
*G06F 12/0866* (2016.01)
(52) U.S. Cl.
CPC .. *G06F 12/0866* (2013.01); *G06F 2212/1021* (2013.01); *G06F 2212/50* (2013.01); *G06F 2212/7201* (2013.01)
(58) Field of Classification Search
CPC .............. G06F 12/0866; G06F 2212/7201
See application file for complete search history.

(56) References Cited

U.S. PATENT DOCUMENTS

| 2013/0166825 | A1* | 6/2013 | Kim ..................... G06F 12/0246 711/103 |
| 2015/0268875 | A1* | 9/2015 | Jeddeloh ................. G06F 3/061 711/103 |
| 2017/0075819 | A1* | 3/2017 | Floratou ............... G06F 12/126 |
| 2017/0262173 | A1* | 9/2017 | Song ..................... G06F 3/0679 |
| 2018/0081569 | A1* | 3/2018 | Kan ...................... G06F 12/121 |
| 2019/0012099 | A1 | 1/2019 | Mulani et al. |
| 2020/0089617 | A1 | 3/2020 | Onishi et al. |

OTHER PUBLICATIONS

International Search Report and Written Opinion issued for Int'l Appl. No. PCT/US2021/019828, Int'l Filing Date Feb. 26, 2021, dated Jun. 17, 2021.

* cited by examiner

*Primary Examiner* — Chie Yew
(74) *Attorney, Agent, or Firm* — ArentFox Schiff LLP

(57) ABSTRACT

Aspects of a storage device including a cache having a logical-to-physical (L2P) mapping table, a scratchpad buffer, and a controller are provided to optimize cache storage of L2P mapping information. A controller receives a random pattern of logical addresses and identifies each logical address within one of multiple probability distributions. Based on a frequency of occurrence of each logical address, the controller stores a control page including the logical address within either a partition of the L2P mapping table which is associated with the corresponding probability distribution, or in the scratchpad buffer. The frequency of occurrence of each logical address is determined based on whether the logical address is within one or more standard deviations from a mean of each probability distribution. As a result, frequently occurring control pages are stored in cache, while infrequently occurring control pages are stored in the scratchpad buffer.

17 Claims, 8 Drawing Sheets

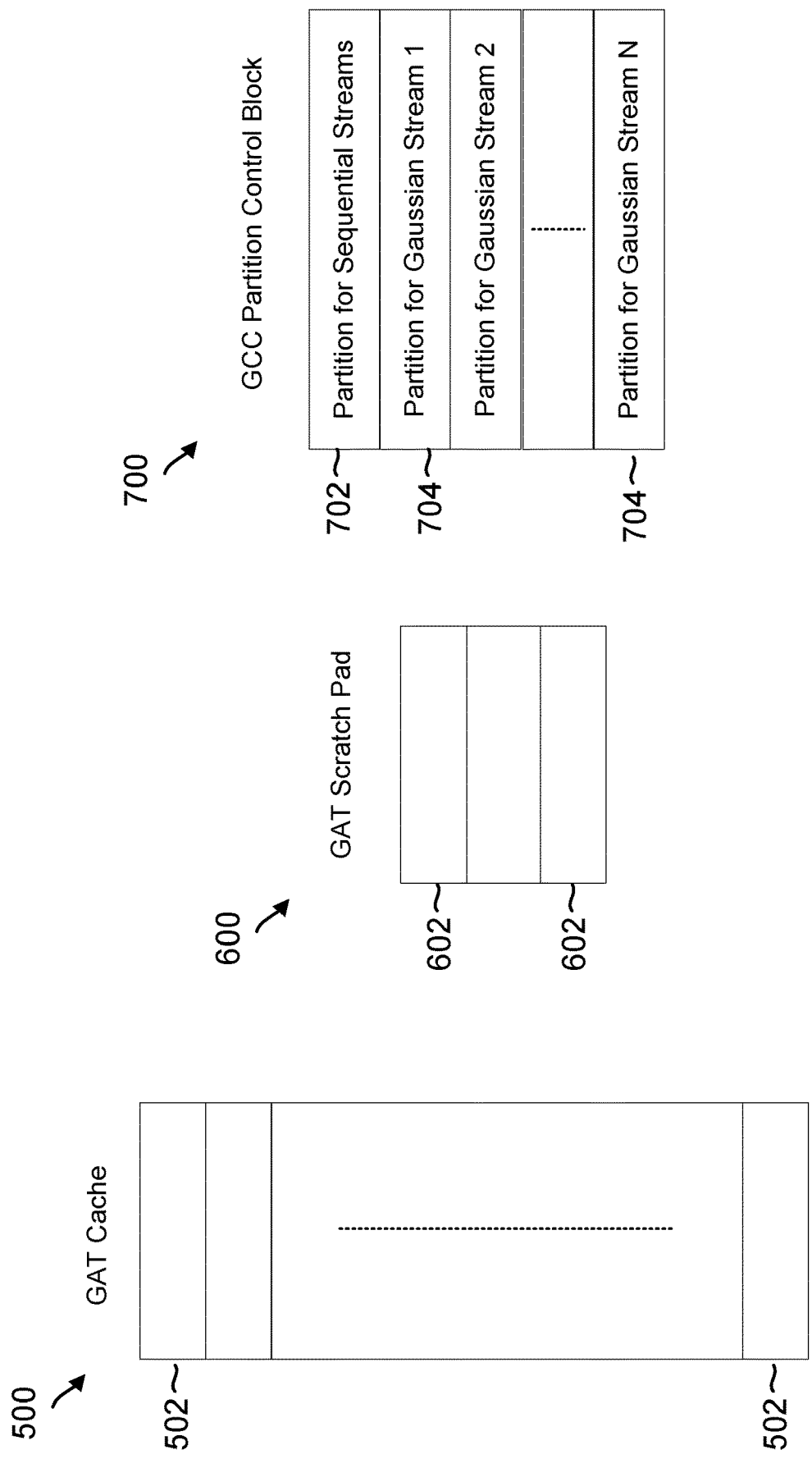

SSD ADDRESS TABLE CACHE MANAGEMENT BASED ON PROBABILITY DISTRIBUTION

BACKGROUND

Field

This disclosure is generally related to electronic devices and more particularly to storage devices.

Background

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

When a controller of the flash storage device reads control information from the non-volatile memory, the control reads are typically associated with large firmware overheads. Therefore, to efficiently process these reads and optimize read performance, a cache is generally maintained in a volatile memory of the controller, e.g. a limited random access memory (RAM), which contains a subset of the control information. When the controller receives read or write commands from a host device including logical addresses (e.g. logical block addresses (LBAs)), the controller may load control information to the cache, or evict control information from the cache, based on each individual LBA. For example, the controller may search for a control page containing a particular LBA in the cache, and if the control page is found (i.e. a cache hit), the controller may access the control page in the cache to read data from an identified physical location. Otherwise, if the control page is not found (i.e. a cache miss), the controller may load the control page into the cache from the control tables in the non-volatile memory. Similarly, if a particular LBA in the cache is not frequently requested in a host command, the controller may evict or remove the control page containing that LBA from the cache to preserve space for other control pages in the limited RAM. For example, the controller may remove control pages from cache which are least recently used (LRU) or least frequently used (LFU) for reading or writing data.

Such cache management process may provide fast read performance for sequential host commands, which are localized in nature over time or address space. For instance, sequential commands that include consecutive logical addresses and are associated with a large amount of data (e.g., at least 512 KB) may result in more cache hits than misses and less control page evictions, resulting in faster reads. However, such cache management process may not alleviate cache misses for random host commands, which are randomly received in time or address space. For instance, random commands that include inconsecutive logical addresses or that are associated with a small amount of data (e.g. less than 512 KB) may result in more cache misses and subsequently slower reads from this process, resulting in reduced read performance.

SUMMARY

One aspect of a storage device is disclosed herein. The storage device includes a cache and a controller. The cache is configured to store a logical-to-physical (L2P) mapping table. The controller is configured to receive a random pattern of logical addresses, to identify one of the logical addresses of the random pattern within a probability distribution, and to store a control page including the logical address within a partition of the L2P mapping table. The partition is associated with the probability distribution.

Another aspect of a storage device is disclosed herein. The storage device includes a cache and a controller. The cache is configured to store a logical-to-physical (L2P) mapping table. The controller is configured to receive a random pattern of logical addresses, and to identify a first one of the logical addresses of the random pattern within a first probability distribution and a second one of the logical addresses of the random pattern within a second probability distribution. The controller is also configured to store a first control page including the first one of the logical addresses within a first partition of the L2P mapping table, and to store a second control page including the second one of the logical addresses within a second partition of the L2P mapping table. The first partition is associated with the first probability distribution and the second partition is associated with the second probability distribution.

A further aspect of a storage device is disclosed herein. The storage device includes a cache, a scratchpad buffer, and a controller. The cache is configured to store a logical-to-physical (L2P) mapping table, and the scratchpad buffer is configured to store L2P cache entries. The controller is configured to receive a random pattern of logical addresses, and to identify a first one of the logical addresses of the random pattern within a first probability distribution, a second one of the logical addresses of the random pattern within a second probability distribution, and a third one of the logical addresses of the random pattern outside the first probability distribution and the second probability distribution. The controller is further configured to store a first control page including the first one of the logical addresses within one of a first partition of the L2P mapping table or the scratchpad buffer, to store a second control page including the second one of the logical addresses within a second partition of the L2P mapping table or the scratchpad buffer, and to store a third control page including the third one of the logical addresses within the scratchpad buffer. The first partition is associated with the first probability distribution and the second partition is associated with the second probability distribution.

It is understood that other aspects of the storage device and method will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein:

FIG. 5 is a conceptual diagram illustrating an example of a global address table (GAT) cache stored in the storage device of FIG. 1.

FIG. 6 is a conceptual diagram illustrating an example of a scratchpad buffer for storing GAT or L2P cache entries in the storage device of FIG. 1.

FIG. 7 is a conceptual diagram illustrating an example of a control block that stores a GAT cache partitioned for different Gaussian streams in the storage device of FIG. 1.

DETAILED DESCRIPTION

Figure 1:
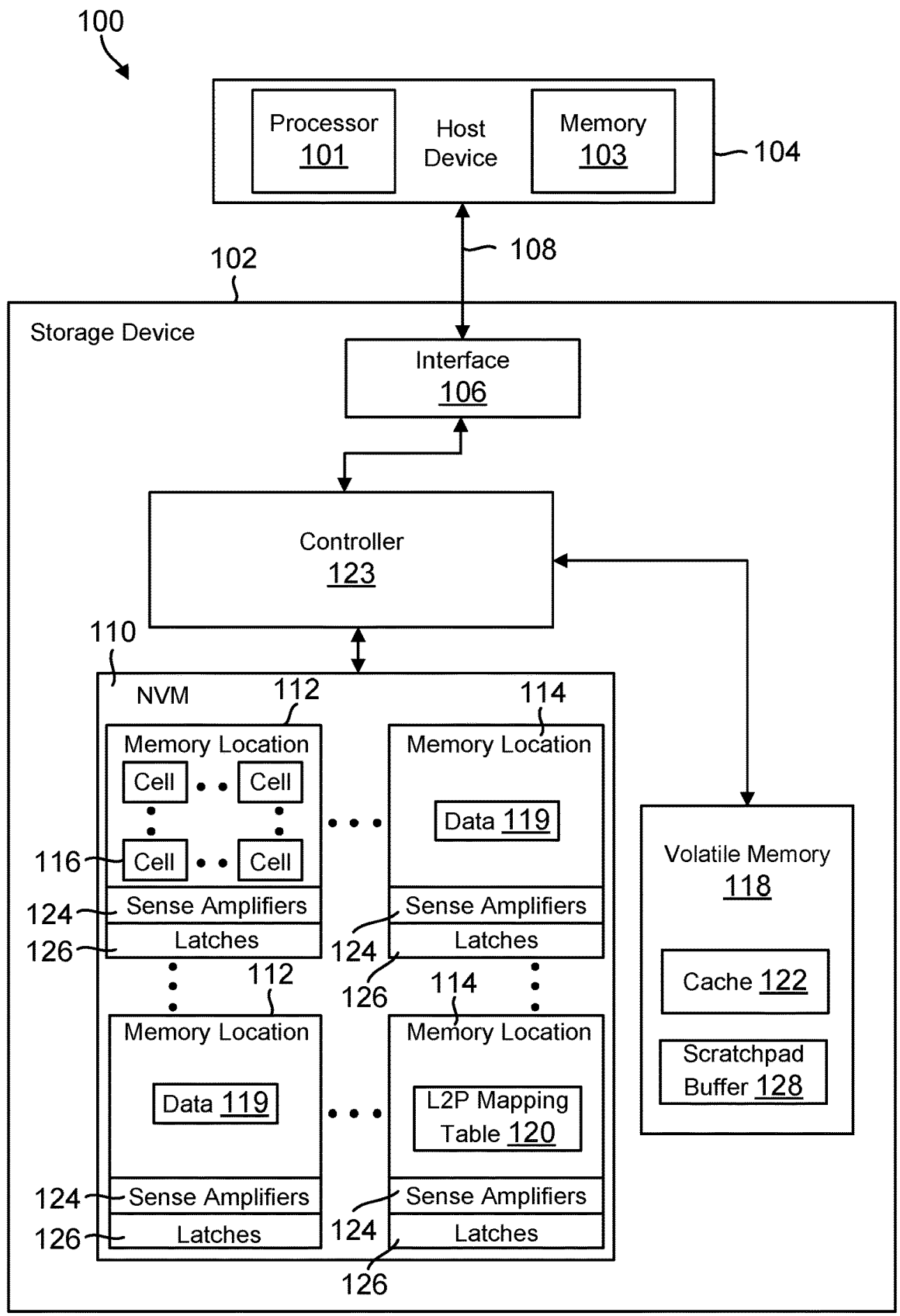
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

When a controller of the storage device receives read or write commands from a host device, the controller may perform control reads of a L2P mapping table for L2P mapping information. The L2P mapping table may also be referred to as a global address table (GAT). The GAT may include multiple GAT pages each including multiple GAT entries, where each GAT entry stores L2P mapping information for a range of logical addresses. For instance, each GAT entry may include L2P mapping information for eight logical addresses (e.g. 4 KB of logical address space), and each GAT page may include 1024 GAT entries (i.e. addressing 4 MB of logical address space). As a result, a storage device including 100 GB of LBA space for data may contain numerous GAT pages occupying 100 MB of GAT space in non-volatile memory.

Since controller RAM is generally not large enough to store an entire GAT, a subset of the GAT is maintained in RAM as GAT cache. The cache allows for optimization of control reads by allowing the controller to more quickly read certain GAT pages from the cache (i.e. cache hits) than from the non-volatile memory. However, in low-cost controllers with limited RAM space, the size of the GAT cache is typically low. For instance, low-cost controllers may only have 128 KB-256 KB of total RAM available for GAT cache. Moreover, when GAT entries are loaded in cache from the non-volatile memory in response to a cache miss, the controller generally loads an entire GAT page as opposed to the GAT entry itself. As a result, when the controller receives a highly random pattern of logical addresses from a host device (e.g. host commands with inconsecutive logical addresses or associated with small amounts of data, e.g. less than 512 KB), the GAT cache may quickly become full, and GAT pages may frequently and redundantly be evicted from and re-loaded to the cache due to increased cache misses in response to subsequent host commands.

Figure 3:
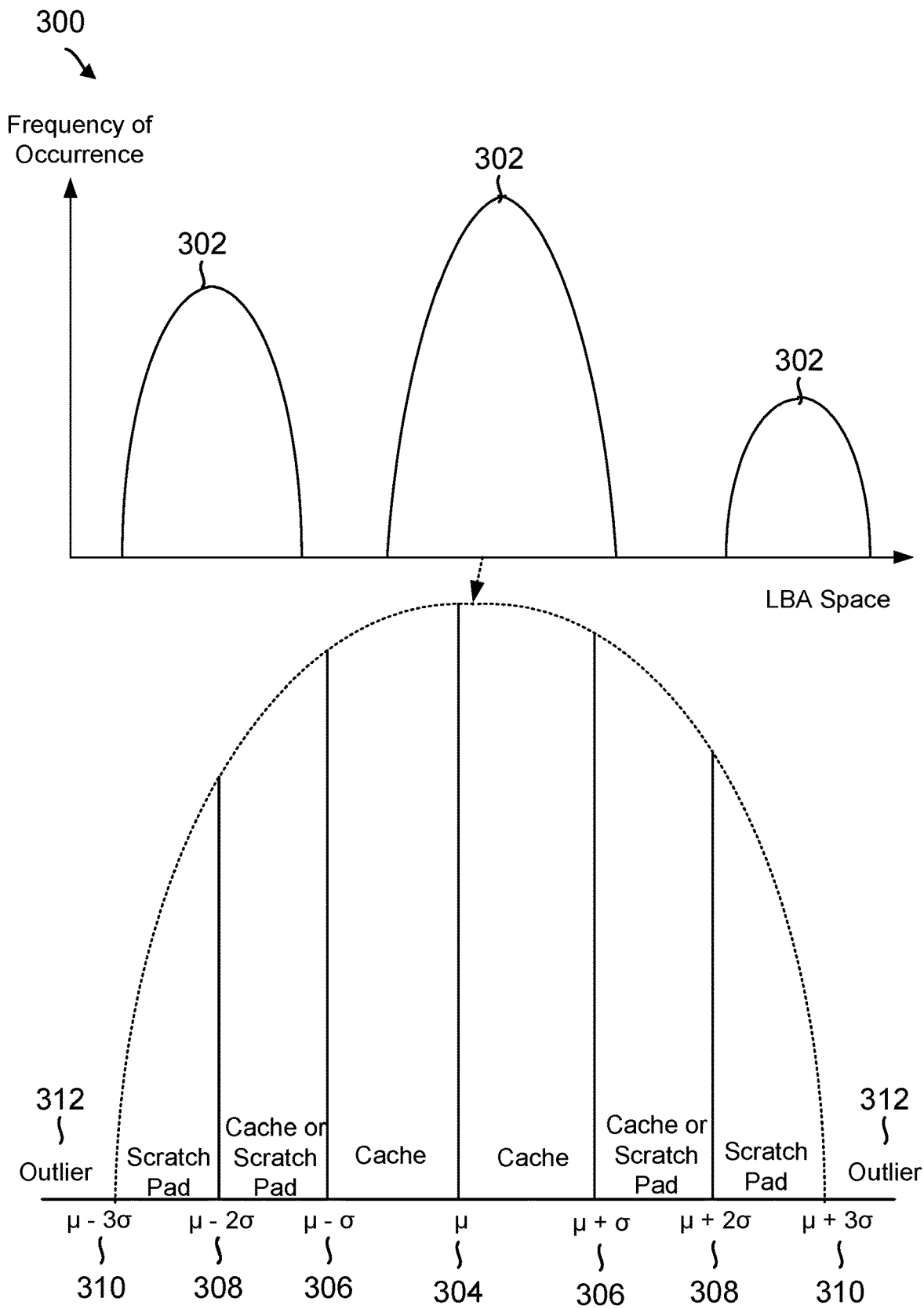
FIG. 3 is a graphical diagram illustrating an example of various Gaussian probability distributions of logical addresses received by the storage device of FIG. 1.

To address this problem, the storage device described in the present disclosure manages the GAT cache based on a probability distribution of logical addresses in incoming host patterns. When the controller of the storage device receives a random pattern of logical addresses from a host device, the controller categorizes each logical address into one of multiple, dynamically formed Gaussian distributions, which may be interleaved over a logical address space (i.e. each probability distribution may be separated from each other as illustrated in FIG. 3), as well as time (i.e. each probability distribution may change over a period of time). Logical addresses which fall within one standard deviation (or sigma) from a mean of a Gaussian distribution may be loaded in the GAT cache, since these addresses have a high probability of repeating in future commands (as generally 68% of LBA inputs fall within one sigma from the mean). However, logical addresses which fall within two or three standard deviations from the mean, or which are outliers (e.g. LBAs which fall outside three standard deviations from the mean), may have a low probability of repeating and thus may result in frequent cache misses and redundant GAT page loads (as generally 32% of LBA inputs fall outside of one sigma from the mean). Accordingly, these less probable logical addresses may either be opportunistically loaded in the GAT cache (e.g. when the cache is not full), or not loaded in the GAT cache and instead temporarily loaded into a scratchpad buffer in the controller RAM, which the controller may also search along with the cache when identifying L2P mapping information for a logical address. As a result of this cache management system described in the present disclosure, the cache hit to cache miss ratio for random patterns may be improved, thereby improving storage device performance with reduced redundancy in cache loading.

When the controller receives a pattern of logical addresses from a host device (e.g. in one or more read or write commands), the controller identifies whether each logical address is associated with a sequential stream or a random pattern. For example, the controller may determine whether a logical address is part of a sequential stream if the logical address is consecutive with previous logical addresses. If the controller determines that the logical address is not sequential (i.e. it is part of a random pattern), the controller determines whether the logical address falls within an existing Gaussian probability distribution or stream. For instance, the controller may identify the mean and sigma for a Gaussian stream of logical addresses, and the controller may determine whether the received logical address is within one, two, or three standard deviations from the mean. If the received logical address is within at most three standard deviations from the mean, then depending on how distant the received logical address is from the mean, the controller may store the GAT page including the GAT entry containing the received logical address in the cache (e.g. based on available GAT cache), or the GAT entry containing the received logical address in the scratchpad buffer. However, if the received logical address is more than three standard deviations from the mean (i.e. it is an outlier to that distribution), the controller may check another Gaussian stream (with a different mean and sigma) and repeat the aforementioned process. If there are no Gaussian streams in which the received logical address may fall, then the controller may create a new Gaussian stream with the received logical address as the mean. The controller may then repeat the above process for each logical address received in the random pattern.

Moreover, the controller may categorize each Gaussian stream as one of multiple states: an inactive state, a ramping state, and an active state. The inactive state may refer to a Gaussian stream which has not yet been identified. For instance, prior to the time a new Gaussian stream is created with a received logical address as the mean, that new Gaussian stream may be considered to be in an inactive state. The inactive state may also refer to a Gaussian stream which is deactivated in response to infrequent logical addresses falling within that stream over a period of time, as described below (with respect to a temperature of the Gaussian stream).

The ramping state may refer to a Gaussian stream in which at least one received logical address is identified. For instance, at the time a new Gaussian stream is created with a received logical address as the mean, or at the time a first received logical address falls within a deactivated Gaussian stream, that new or deactivated Gaussian stream may be switched to the ramping state. Since the mean and sigma of a Gaussian stream in the ramping state are tentative (i.e. the stream is still being formed), the GAT pages or entries including logical addresses falling within a ramping state Gaussian stream may in one example not be dynamically stored in cache or the scratchpad buffer based on means and standard deviations as described above. Rather, in this example, such GAT pages or entries may be statically stored in one of the cache or scratchpad buffer based on a configuration of the storage device. Moreover, received logical addresses may be identified to fall within a Gaussian stream in the ramping state based on a preconfigured ramping criterion or constraint, e.g. if subsequent logical addresses are within a threshold distance below or above the tentative mean. If a received logical address does not satisfy the ramping constraint (e.g. the logical address is not within the threshold distance below or above the tentative mean), the logical address is considered an outlier to the ramping Gaussian stream and considered in another Gaussian stream as described above.

The active state may refer to a Gaussian stream which has a number of received logical addresses satisfying the ramping constraint that meets an active threshold. For instance, if the active threshold is 100 (or another number), then a ramping Gaussian stream will be switched to an active Gaussian stream once 100 received logical addresses (or other number) in a random pattern fall within the threshold distance below or above the tentative mean. The mean and sigma of this Gaussian stream, which are evaluated based on the received logical addresses falling within the Gaussian stream, are no longer tentative when the Gaussian stream transitions to the active state. Therefore, the GAT pages or entries including subsequent logical addresses falling within the active state Gaussian stream may be dynamically stored in cache or the scratchpad buffer based on means and standard deviations as described above. The mean and sigma of an active Gaussian stream may be repeatedly calculated from received logical addresses over a historical window size (e.g. a size equal to the active threshold), and thus the Gaussian stream may linearly move over time. For instance, if subsequent logical addresses falling within the active Gaussian stream are typically larger than earlier logical addresses that fell within the same stream, then the mean and sigma which are evaluated over the historical window size (e.g. the last 100 logical addresses within this stream) may consequently become larger and the Gaussian stream will translate to the right on the graph of FIG. 3 accordingly. As each Gaussian stream will have separately (and similarly) calculated means and standard deviations, multiple active Gaussian streams may be simultaneously handled without cross-interference.

Additionally, if a number of received logical addresses do not fall within an active Gaussian stream (e.g. over a period of time), the Gaussian stream may be switched back to an inactive state based on a temperature of the Gaussian stream. As used herein, the temperature of a Gaussian stream refers to a hit count of logical addresses falling within that Gaussian stream. The hit count or temperature of that Gaussian stream may increase when a received logical address is identified to fall within that stream. Similarly, the hit count or temperature of that Gaussian stream may decrease when a received logical address is identified to fall outside that stream (e.g. the logical address is an outlier of the Gaussian stream). Whenever a received logical address is identified as falling within a Gaussian stream, the temperature of each Gaussian stream is updated accordingly and compared against a temperature threshold. If the updated temperature meets the temperature threshold, the Gaussian stream may maintain its previous state (e.g. active). Otherwise, if the updated temperature falls below the temperature threshold, the Gaussian stream may be switched back to the inactive state.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, Hiper-LAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

As shown in the exemplary embodiment of FIG. 1, the storage device 102 includes non-volatile memory (NVM) 110 for non-volatilely storing data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the illustrated exemplary embodiment of FIG. 1, each memory location 112 may be a block 114 including multiple cells 116. The cells 116 may be single-level cells, multi-level cells, triple-level cells, quad-level cells, and/or penta-level cells, for example. Other examples of memory locations 112 are possible; for instance, each memory location may be a die containing multiple blocks. Moreover, each memory location may include one or more blocks in a 3-D NAND array. Moreover, the illustrated memory locations 112 may be logical blocks which are mapped to one or more physical blocks.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

The volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 2:
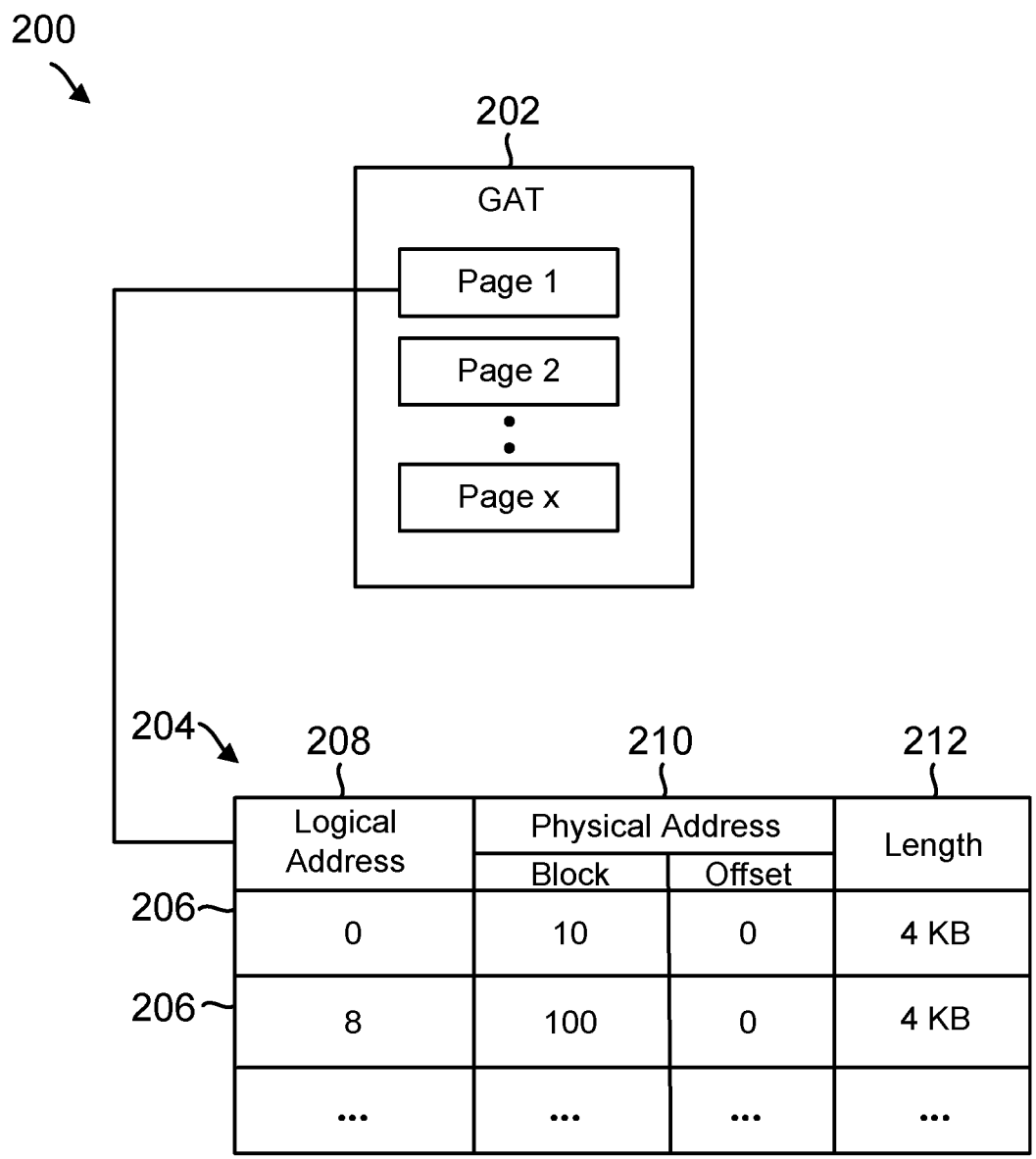
FIG. 2 is a conceptual diagram illustrating an example of a logical-to-physical mapping table in a non-volatile memory of the storage device of FIG. 1.

FIG. 2 is a conceptual diagram 200 illustrating an example of an L2P mapping table or GAT 202 which includes mappings of logical addresses to physical addresses in the NVM 110 of FIG. 1. The GAT 202 may correspond to the L2P mapping table 120 in FIG. 1. In one exemplary embodiment, the GAT 202 may include one or more GAT pages 204, e.g., pages 1 to x, where x is the total number of pages in the GAT. Each GAT page 204 may include one or more GAT entries 206 each identifying a logical block address (LBA) 208, a physical address 210 associated with the data written to the NVM, and a length 212 of the data. LBA 208 may be a logical address specified in a read or write command received from the host device. Physical address 210 may indicate the block and the offset at which the data associated with LBA 208 is to be physically written or read. Length 212 may indicate a size of the data (e.g. 4 KB or some other size).

Referring back to FIG. 1, the cache 122 may contain GAT pages 204 to optimize read and write performance. Typically, when the controller 123 receives a read command or a write command for data 119, the controller may check the cache 122 for the logical-to-physical mapping of each data (e.g. the GAT entries 206). If a mapping is not present (i.e. a cache miss), the controller may access the L2P mapping table 120 and store the mapping (e.g. the GAT page 204) in the cache 122. Otherwise, if the mapping is present (i.e. a cache hit), the controller may access the GAT page from the cache 122. The controller may then read the data from or write the data to the NVM 110 at the specified physical address in the mapping. When the cache 122 becomes full, GAT pages which are LRU or LFU may be evicted from the cache in favor of new GAT pages from the NVM 110. As a result, as cache accesses may be faster than NVM accesses, the cache 122 may allow the controller 123 to more rapidly obtain GAT entries for executing read or write commands than the NVM 110.

However, while the above approach may provide optimal read and write performance for sequential patterns of logical addresses 208, such approach may result in increased cache misses and redundant GAT pages 204 in cache 122 for random patterns of logical addresses as described above. To improve performance for random patterns, the logical addresses 208 may be categorized in one or more Gaussian probability distributions, and the GAT pages 204 including GAT entries 206 containing these logical addresses may be stored in the cache 122 based on their categorization. Moreover, a portion of the volatile memory 118 may be allocated by the controller for use as a scratchpad buffer 128, which may temporarily store GAT entries 206 that are not stored in the cache 122 based on the categorization of the above logical addresses.

FIG. 3 illustrates a diagram 300 which graphically represents various examples of probability distributions 302 for received logical addresses (e.g. one or more random patterns of logical addresses 208). Each probability distribution 302 may be in the form of a Gaussian curve and include a mean 304 and a standard deviation (sigma). Approximately 68% of logical addresses within each probability distribution 302 may fall within one standard deviation 306 from the mean (i.e. $<\mu-\sigma, \mu+\sigma>$), approximately 98% of logical addresses within each probability distribution 302 may fall within two standard deviations 308 from the mean (i.e. $<\mu-2\sigma, \mu+2\sigma>$), and all the logical addresses within each probability distribution 302 may fall within three standard deviations 310 from the mean (i.e. $<\mu-3\sigma, \mu+3\sigma>$). Logical addresses that fall outside the three standard deviations 310 are considered outliers 312 of a given probability distribution, or may be present in another probability distribution. Multiple probability distributions including different ranges of logical addresses may be simultaneously managed with different frequencies of occurrence (repetition in host commands) converging on the mean 304, as illustrated in the example of FIG. 3. While FIG. 3 illustrates a particular number of Gaussian distributions (i.e. 3) with various LBA ranges and occurrence frequencies, other numbers of Gaussian distributions with different LBA ranges and occurrence frequencies may exist.

The controller 123 may store GAT pages 204 including the logical addresses 208 within a probability distribution 302 depending on whether they are within one standard deviation 306, two standard deviations 308, or three standard deviations 310 from the mean 304. For example, if the controller 123 identifies a logical address to be within one standard deviation 306 from the mean, the controller may determine that this logical address has a relatively high occurrence frequency (or probability of being repeated in subsequent commands), and therefore the controller may store the GAT page 204 including the GAT entry 206 containing this logical address in the cache 122. However, if the controller 123 identifies a logical address to be within two standard deviations 308 from the mean but not within one standard deviation 306, the controller may determine that this logical address has a relatively moderate occurrence frequency, and therefore the controller may opportunistically store the corresponding GAT page in the cache 122 based on available GAT cache size. For example, the controller 123 may check the cache 122 to determine whether it is full, and if there is space available, the controller 123 may store the GAT page 204 including the logical address in the cache. Otherwise if the cache is full, then rather than evicting previously cached GAT pages that may correspond to higher occurrence frequencies than the current GAT page, the controller 123 may instead store the GAT entry 206 containing the logical address within the scratchpad buffer 128 separate from the cache 122. Similarly, if the controller 123 identifies a logical address to be within three standard deviations 310 from the mean but not within two standard deviations 308, the controller may determine that this logical address has a relatively low occurrence frequency, and therefore the controller may store the GAT entry 206 including the logical address in the scratchpad buffer 128.

Figure 4:
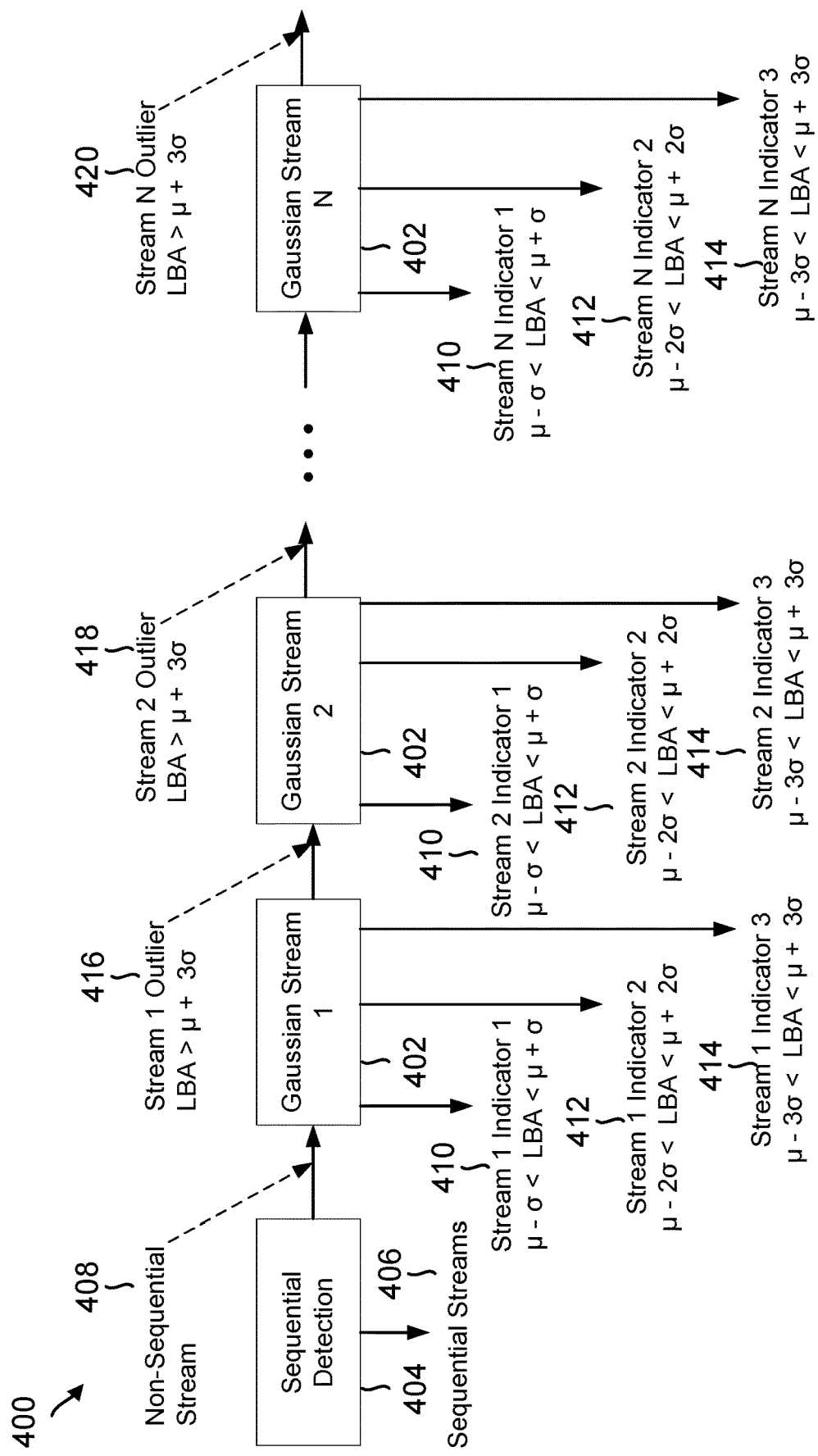
FIG. 4 is a conceptual diagram illustrating an example process for categorizing a logical address within one of multiple Gaussian probability distributions or streams, which is performed by the storage device of FIG. 1.

FIG. 4 illustrates an example diagram 400 of a process performed by the controller 123 to identify a received logical address (e.g. logical address 208) within a particular probability distribution or Gaussian stream 402 (e.g. probability distribution 302). When the controller 123 receives a random pattern of logical addresses (e.g. in one or more read or write commands from the host device 104), the controller first performs a sequential detection process 404 to identify whether the received logical address is in a sequential stream 406 or a non-sequential stream 408. For example, the controller 123 may compare the received logical address with a sequence of prior logical addresses, and if the logical addresses are all consecutive, the controller may categorize the received logical address as belonging to a sequential stream. The controller may alternatively determine whether the received logical address is sequential in other ways.

If the controller determines that the received logical address belongs to a non-sequential stream (i.e. it is within a random pattern), the controller may determine whether the received logical address is within any of the Gaussian streams 402. For instance, as illustrated in FIG. 4, the controller may first determine whether the received logical address is within a first one of the Gaussian streams 402 (i.e. Gaussian Stream 1, which may correspond to the probability distribution 302 at the left of FIG. 3, for example). The controller may determine whether the logical address is within the Gaussian stream by comparing the logical address to the mean (e.g. mean 304) and sigma of that distribution. If the controller identifies the logical address as falling within one standard deviation from the mean (e.g. one standard deviation 306), the controller may categorize the logical address with a first indicator 410 (stream category one) within that probability distribution or stream. If the controller identifies the logical address as falling within two standard deviations from the mean (but not within one standard deviation from the mean, e.g. two standard deviations 308), the controller may categorize the logical address with a second indicator 412 (stream category 2) within that probability distribution or stream. If the controller identifies the logical address as falling within three standard deviations from the mean (but not within two standard deviations from the mean, e.g. three standard deviations 310), the controller may categorize the logical address with a third indicator 414 (stream category 3) within that probability distribution or stream.

If the controller identifies the logical address as falling outside three standard deviations from the mean (e.g. outlier 312), the controller may categorize the logical address as an outlier 416 of that probability distribution or stream. If the logical address is categorized as an outlier 416, then the controller may determine whether the received logical address is within a next one of the Gaussian streams 402 (i.e. Gaussian Stream 2, which may correspond to the probability distribution 302 at the middle of FIG. 3, for example). For example, the controller may repeat the aforementioned process of determining whether the logical address may be categorized with the first indicator 410 (one standard deviation), the second indicator 412 (two standard deviations), or the third indicator 414 (three standard deviations) within the next Gaussian stream, or as an outlier 418 to that next Gaussian stream. If the logical address is categorized as an outlier 418 of that next stream, the controller may repeat the aforementioned process again for any following Gaussian streams (i.e. up until Gaussian Stream N in FIG. 4, which may correspond to the probability distribution 302 at the right of FIG. 3, for example). If the logical address is still categorized as an outlier 420 of even that final stream, the controller may create a new Gaussian stream including the received logical address as the mean.

Accordingly, the controller 123 may store a GAT page 204 including a received logical address in the cache 122 or a scratchpad buffer based on its determined stream category or indicator. For example, if the logical address is associated with the first indicator 410 (i.e. Stream Category 1: $\mu-\sigma<LBA<\mu+\sigma$), the GAT page 204 including the corresponding GAT entry 206 having the received logical address is stored in the cache 122 (if not previously loaded into the cache). If the logical address is associated with the second indicator 412 (i.e. Stream Category 2: $\mu-2\sigma<LBA<\mu-\sigma$ or $\mu+\sigma<LBA<\mu+2\sigma$), the controller may search the cache 122 to determine if the GAT page 204 including the corresponding GAT entry 206 is previously loaded, and if there are available pages for GAT caching, the GAT page 204 is stored in the cache 122. If the logical address is associated with the third indicator 414 (i.e. Stream Category 3: $\mu-3\sigma<LBA<\mu-2\sigma$ or $\mu+2\sigma<LBA<\mu+3\sigma$), the controller may not cache the GAT page 204 and instead may load the corresponding GAT entry 206 into the scratchpad buffer 128. If the logical address is an outlier 416, 418, the controller may check subsequent Gaussian streams 402 as described above before caching/storing. If the logical address is an outlier 420 of all existing Gaussian streams 402, the controller may store the corresponding GAT entry 206 into the scratchpad buffer 128.

FIG. 5 illustrates an example diagram of a GAT cache 500. GAT cache 500 may correspond to cache 122 of FIG. 1. The GAT cache 500 may store multiple GAT cache control (GCC) pages 502, which may correspond to GAT pages 204. The GAT cache 500 may be pre-allocated in the volatile memory 118 with a minimum size (e.g. 128 KB or another number), and the GAT cache may dynamically grow and shrink in size (e.g. between 128 KB and 256 KB or other number). The size of each GCC page 502 may also be configurable by the controller 123. The GAT cache 500 may be associated with a free list (e.g. a list indicating which logical addresses in the GAT cache are free for storing GCC pages 502), an allocated list (e.g. a list indicating which logical addresses in the GAT cache are allocated to GCC pages 502), a hit count (e.g. a count of cache hits for GCC pages 502), and a miss count (e.g. a count of cache misses for GCC pages 502).

FIG. 6 illustrates an example diagram of a GAT scratchpad 600. GAT scratchpad 600 may correspond to scratchpad buffer 128 of FIG. 1, which may temporarily store GAT entries 602 (e.g. GAT entries 206). The GAT scratch pad 600 may be pre-allocated in the volatile memory with a minimum size (e.g. 1% of the size of the GCC cache 500, or another percentage or size). The number of GAT entries 602 stored in the GAT scratch pad may also be configurable by the controller 123. The GAT entries 602 may be stored and overwritten in the GAT scratchpad 600 based on a Round Robin usage allocation or other configuration. For instance, if the GAT scratchpad 600 contains three GAT entries 602 as illustrated in FIG. 6, then after a first, second, and third GAT entry are stored in the scratchpad, a fourth, fifth, and sixth GAT entry may respectively overwrite the first, second, and third GAT entries and the process may repeat similarly for subsequent GAT entries. While FIG. 6 illustrates a specific example where three GAT entries 602 may be stored in the scratchpad at one time, the GAT scratch pad 600 may be configured to store any number of GAT entries as described immediately above. Additionally, the GAT scratch pad 600 may be associated with an indicator of a total number of loads (e.g. a count of the total number of GAT entries 602 stored in the scratch pad over a period of time).

FIG. 7 illustrates an example diagram of a GCC partition control block 700. The GCC partition control block 700 may correspond to the GAT cache 500, or may be a memory location in volatile memory 118 that stores the GAT cache 500. The GCC partition control block 700 may include multiple partitions, including a sequential stream partition 702 and one or more Gaussian stream partitions 704. The sequential stream partition 702 may store GAT pages having sequential logical addresses (e.g. identified as sequential streams 406). Each Gaussian stream partition 704 may store GAT pages having logical addresses identified within a respective Gaussian stream 402.

The number of Gaussian stream partitions 704 may correspond to a current number of Gaussian streams 402. For example, when three probability distributions 302 or Gaussian streams 402 are identified (as described above), the controller may configure the GCC partition control block 700 to include three Gaussian stream partitions 704 each corresponding to a respective Gaussian stream 402. For instance, the partition 704 for Gaussian Stream 1 may store GAT pages having logical addresses within the left probability distribution of FIG. 3, the partition 704 for Gaussian Stream 2 may store GAT pages having logical addresses within the middle probability distribution of FIG. 3, and the partition 704 for Gaussian Stream N may store GAT pages having logical addresses within the right probability distribution of FIG. 3.

Each partition 704 corresponding to a Gaussian stream 402 may be associated with a stream state, e.g. an inactive state, a ramping state, or an active state. As described above, the inactive state may refer to a Gaussian stream which has not yet been identified, or a previously active Gaussian stream which is deactivated in response to infrequent logical addresses falling within that stream (e.g. based on a low temperature or hit count). The ramping state may refer to a Gaussian stream in which at least one received logical address is identified. Received logical addresses may be identified to fall within a Gaussian stream in the ramping state based on a ramping constraint, e.g. if the logical address is within a threshold distance below or above a tentative mean. The active state may refer to a Gaussian stream which has a number of received logical addresses satisfying the ramping constraint that meets an active threshold. The controller may be configured to store GAT pages or GAT entries including logical addresses identified within an active Gaussian stream in a corresponding partition 704 or the GAT scratch pad 600 depending on whether the logical address is within one, two, or three standard deviations from the mean as described above. In contrast, the controller may be configured to store GAT pages or GAT entries including logical addresses identified within a ramping Gaussian stream in either a corresponding partition 704 or the GAT scratch pad 600 regardless of where the logical address falls in terms of standard deviation relative to the mean (e.g. based on a separate configuration).

The number of Gaussian stream partitions 704 may dynamically change with the number of Gaussian streams 402 based on the stream states. For instance, as new Gaussian streams 402 are created (e.g. transitioned to an active state in response to a number of logical addresses having met the active threshold for that stream), the controller may reconfigure the GCC partition control block to include additional partitions 704 corresponding to those new Gaussian streams. Similarly, as existing Gaussian streams 402 are deactivated (e.g. transitioned to an inactive state in response to a low temperature or hit count for that stream), the controller may reconfigure the GCC partition control block to remove partitions 704 corresponding to those deactivated Gaussian streams.

Moreover, a size of each Gaussian stream partition 704, or a number of GCC pages (GAT pages) allocated to each partition, may differ for each Gaussian stream. For example, the controller may configure a partition 704 to have a larger size or to store a larger number of GCC pages when the associated Gaussian stream 402 has a larger range of logical addresses, while the controller may configure a partition 704 to have a smaller size or to store a smaller number of GCC pages when the associated Gaussian stream 402 has a smaller range of logical addresses. Thus, the middle probability distribution 302 in FIG. 3 may be configured with a larger partition than the right probability distribution 302 in FIG. 3. Additionally, the size of each partition 704 or number of GCC pages allocated to each partition may dynamically change in accordance with corresponding Gaussian streams 402. For instance, if a range of logical addresses associated with a Gaussian stream (or a standard deviation from a mean of that stream) is increased over time, e.g. based on a received random pattern of logical addresses, the controller may reconfigure the GCC control block 700 to increase the size of the partition or number of GAT pages in that partition associated with that Gaussian stream. Similarly, if a range of logical addresses associated with a Gaussian stream (or a standard deviation from a mean of that stream) is decreased over time based on the random pattern, the controller may reconfigure the GCC control block to decrease the size of the partition or number of GAT pages in that partition associated with that Gaussian stream.

Each partition 704 may also be associated with a temperature or hit count corresponding to a number of times a logical address is identified as falling within the Gaussian stream 402 corresponding to that partition (e.g. within a period of time). The temperature of the partition may increase when a logical address is identified as falling within the corresponding Gaussian stream, and the temperature of the partition may decrease when a logical address is identified as falling outside the corresponding Gaussian stream (e.g. as an outlier 416, 418, 420). The controller may determine that a logical address is an outlier for active Gaussian streams when the logical address is not within three standard deviations 310 from the mean 304. The controller may determine that a Gaussian stream is active when the number of logical addresses within the Gaussian stream meets an active threshold, as described above. The controller also may determine that a logical address is an outlier for ramping Gaussian streams differently than for active Gaussian streams, e.g. based on a ramping constraint, for example, when the received logical address exceeds a threshold distance from the mean, as described above.

The GCC control block 700 may store various information associated with the partitions 704 accordingly. For example, the GCC control block 700 may store the stream state associated with each partition (e.g. inactive, ramping, or active), the number of GCC pages associated with each partition, the temperature of each partition, the active threshold, and the ramping constraint. Moreover, the GCC control block 700 may store a LRU list associated with one or more of the partitions, which may include the least recently used GAT pages that the controller may evict or overwrite in favor of new GAT pages when a partition is full. The GCC control block 700 may also store statistical variables including multiple hit counts for each Gaussian stream that are updated whenever a logical address is identified as falling within one standard deviation 306 (a first hit count), within two standard deviations 308 (a second hit count), within three standard deviations 310 (a third hit count), and outside three standard deviations (an outlier hit count).

Figure 8:
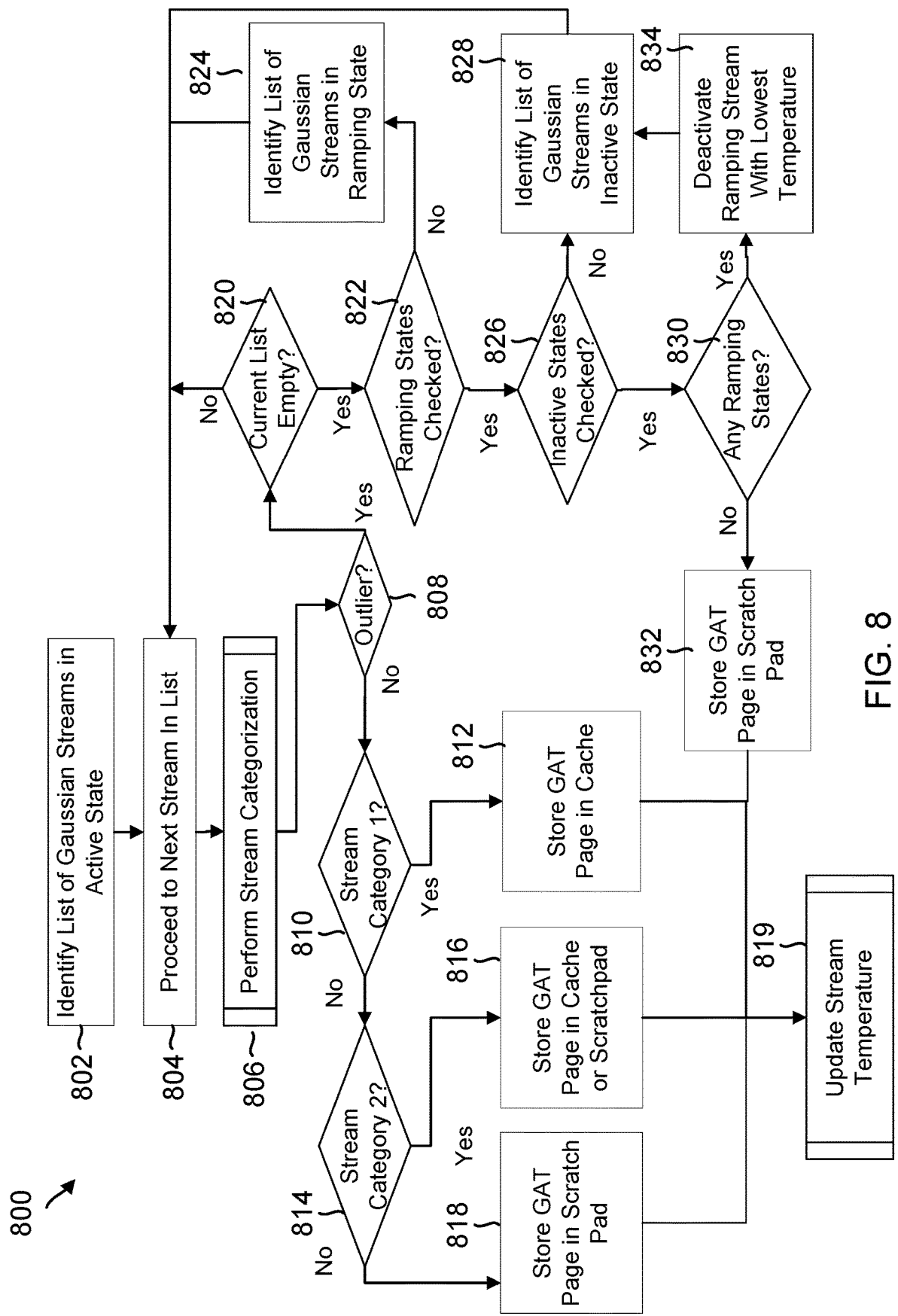
FIG. 8 is a flow chart illustrating a method for storing a GAT control page in the GAT cache or the scratchpad buffer based on a Gaussian probability distribution or stream, which is performed by the storage device of FIG. 1.

FIG. 8 illustrates an example flow chart 800 of a method for storing a GAT page in the GAT cache or the scratchpad buffer based on Gaussian streams. For example, the method can be carried out in a storage device 102 such as the one illustrated in FIG. 1. Each of the steps in the flow chart can be controlled using the controller as described below (e.g. controller 123), or by some other suitable means. The method may be performed by the controller once it determines that a received logical address is not part of a sequential stream (e.g. after performing sequential detection 404).

As represented by block 802, the controller may identify a list of Gaussian streams in the active state. For example, referring to FIGS. 3 and 4, the controller may identify the probability distributions 302 or Gaussian streams 402 which are associated with the active state. Then, as represented by block 804, the controller may process the next Gaussian stream in the list of active streams. For example, referring to FIGS. 3 and 4, the controller may proceed to determine if the received logical address is within the first active probability distribution (probability distribution 302) or Gaussian stream 402. Accordingly, as represented by block 806, the controller may perform stream categorization for the logical address. For example, referring to FIG. 4, the controller may determine whether the logical address may be categorized with the first indicator 410 (stream category 1), the second indicator 412 (stream category 2), the third indicator 414 (stream category 3), or as an outlier 416, 418. The stream categorization process is described in more detail below with respect to FIG. 9.

Once the controller determines the stream category, then as represented by block 808, the controller determines whether the received logical address is an outlier to the current Gaussian stream in the active list. If not, then as represented by block 810, the controller determines whether the logical address falls within the first stream category, in which case, as represented by block 812, the controller may store the GAT page including the logical address in the cache. For example, referring to FIGS. 1-5, if the controller determines that the logical address is not an outlier 416, 418 and is within one standard deviation 306 from the mean 304 (e.g. first indicator 410), the controller may store the GAT page 204 (GCC page 502) including that logical address within the cache 122 (GAT cache 500). If the logical address does not fall within the first stream category, then as represented by block 814, the controller may determine whether the logical address falls within the second stream category, in which case, as represented by block 816, the controller may store the GAT page including the logical address in the cache or scratchpad buffer. For example, referring to FIGS. 1-6, if the controller determines that the logical address is not within one standard deviation 306 from the mean 304 but is within two standard deviations 308 from the mean (e.g. second indicator 412), the controller may opportunistically store the GAT page 204 (GCC page 502) including that logical address within the cache 122 (GAT cache 500) when the cache is not full, or otherwise within the scratchpad buffer 128 (GAT scratch pad 600). Otherwise, if the logical address also does not fall within the second stream category, then the logical address falls within the third stream category, and thus as represented by block 818, the controller may store the GAT page including the logical address in the scratchpad buffer. For example, referring to FIGS. 1-6, if the controller determines that the logical address is not within two standard deviations 308 from the mean 304 but is within three standard deviations 310 from the mean (e.g. third indicator 414), the controller may store the GAT page 204 (GCC page 502) including that logical address within the scratchpad buffer 128 (GAT scratch pad 600). After the controller stores the GAT page in either the cache or scratch pad as described above, then as represented by block 819, the controller may update the temperature of the Gaussian stream, which is described in more detail below with respect to FIG. 10.

Alternatively, if the controller determines back at block 808 that the received logical address is an outlier to the current Gaussian stream in the active list, then as represented by block 820, the controller determines whether the active list is empty (i.e. whether there are other active Gaussian streams to consider). If not, then the controller may repeat the process described above starting from block 804 for the next active Gaussian stream. Otherwise, if there are no further active Gaussian streams, then as represented by block 822, the controller determines whether there are ramping Gaussian streams to be considered. In such case, then as represented by block 824, the controller identifies a list of Gaussian streams in the ramping state and repeats the process described above starting from block 804 for the ramping Gaussian streams. If the controller determines afterwards again that the received logical address is an outlier even to all of the ramping Gaussian streams (or if there are no ramping Gaussian streams), then as represented by block 826, the controller may determine whether there are inactive (deactivated) Gaussian streams to be considered. In such case, then as represented by block 828, the controller may identify a list of Gaussian streams in the inactive state and may repeat the process described above starting from block 804 for the inactive Gaussian streams.

If there are no inactive Gaussian streams, then the controller may create a new ramping stream including this received logical address. For example, as represented by block 830, the controller may determine whether there are currently any ramping Gaussian streams, and if not, then as represented by block 832, the controller may store the GAT page including the logical address in the scratchpad buffer. For example, referring to FIGS. 1-6, if the controller determines that the logical address is an outlier 420 to all existing Gaussian streams 402, the controller may store the GAT page 204 (GCC page 502) including that logical address within the scratchpad buffer 128 (GAT scratch pad 600), as well as create a new Gaussian stream including that logical address as its mean. The controller may also update the temperature of the Gaussian stream as represented by block 819. Otherwise, if at least one ramping Gaussian stream exists, then as represented by block 834, the controller may identify the ramping Gaussian stream having the lowest temperature or hit count and deactivate that Gaussian stream. As a result, the deactivated Gaussian stream may transition to the inactive state, and the controller may repeat the process described above starting at blocks 828 and 804 for the inactive Gaussian stream.

Figure 9:
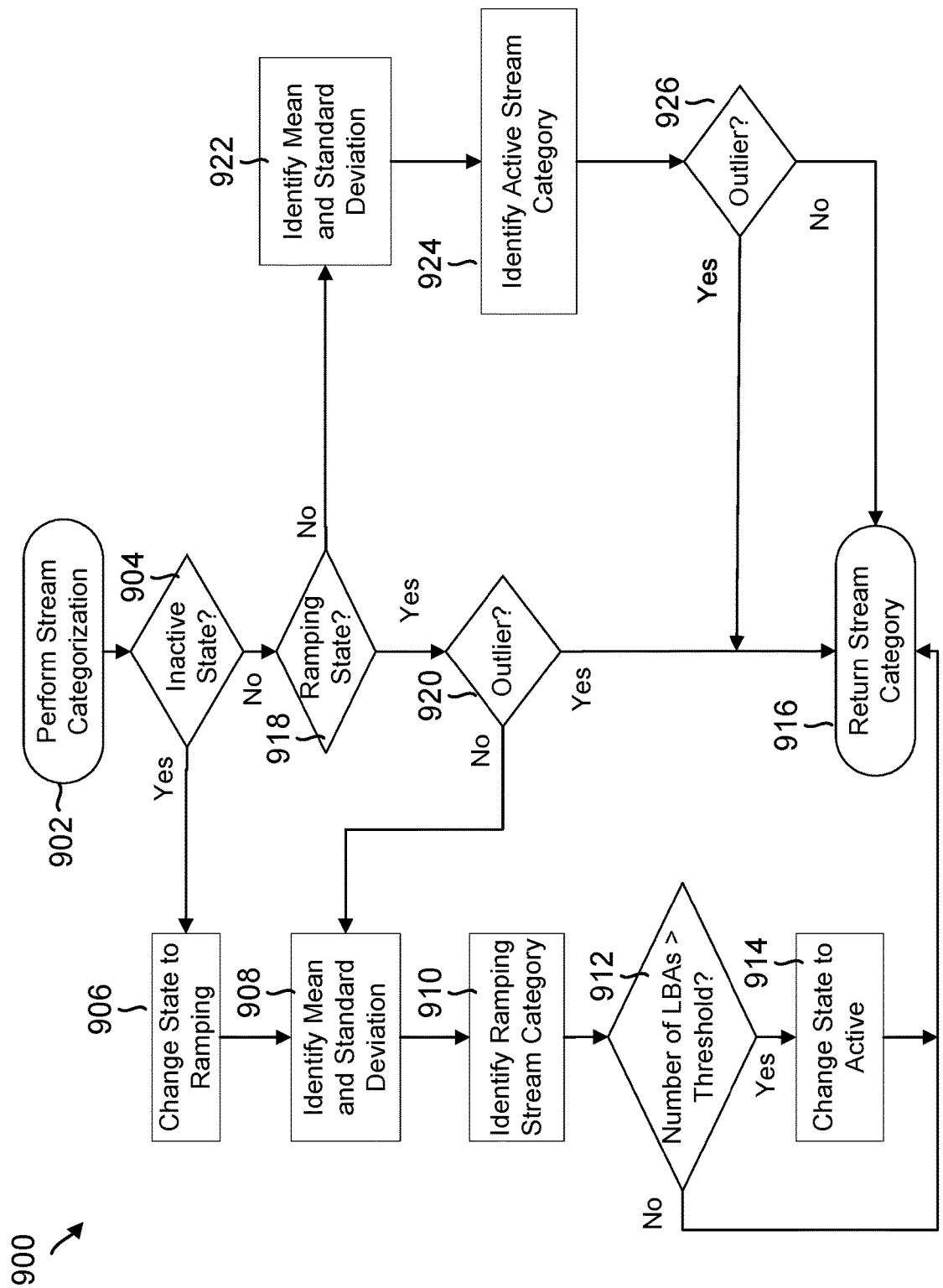
FIG. 9 is a flow chart illustrating a method for categorizing a logical address in a Gaussian stream during the storage process of FIG. 8.

FIG. 9 illustrates an example flow chart 900 of a method for categorizing a logical address in a Gaussian stream. For example, the method can be carried out in a storage device 102 such as the one illustrated in FIG. 1. Each of the steps in the flow chart can be controlled using the controller as described below (e.g. controller 123), or by some other suitable means. As represented by block 902, controller may perform stream categorization as described below, which may begin, for example, at block 806 of the storage process of FIG. 8.

As represented by block 904, the controller may determine whether the current Gaussian stream being considered for a received logical address is within the inactive state. If so, then as represented by block 906, the controller may change the state of the current Gaussian stream to a ramping state (e.g. since at least one logical address may be identified within the current Gaussian stream), and as represented by block 908, the controller may identify a mean and standard deviation for the current Gaussian stream. For example, referring to FIG. 3, the controller may calculate the mean 304 of a probability distribution 302 based on the logical addresses previously identified within the current Gaussian stream (if any), and the controller may calculate the standard deviation 306 based on the mean. Then, as represented by block 910, the controller may identify the category of the logical address within the current ramping stream. For instance, the controller may determine whether the logical address is within a threshold distance from the calculated mean, in which case the controller may identify the category to be stream category 3 (or other category), for example. The controller may then determine, as represented by block 912, whether the number of logical addresses within the current ramping stream meets an active threshold, in which case then as represented by block 914, the controller may transition the current ramping state to the active state. Otherwise, the controller may return the identified stream category (e.g. the ramping stream category), as represented by block 916, to be processed beginning at block 808 of FIG. 8.

If, however, the controller determines at block 904 that the current Gaussian stream is not in the inactive state, then as represented by block 918, the controller may determine whether the current Gaussian stream is in the ramping state. If the current Gaussian stream is in the ramping state, then as represented by block 920, the controller may determine whether the logical address is an outlier to the current ramping Gaussian stream. For example, the controller may check whether the logical address exceeds the threshold distance from the mean described above. If not, then the controller may repeat the process described above beginning at block 908. Otherwise, the controller may identify the logical address to be an outlier of the current ramping Gaussian stream, and the controller may return the identified stream category (e.g. outlier) at block 916.

If the controller also determines at block 918 that the current Gaussian stream is not in the ramping state, then the controller may determine that the current Gaussian stream is in the active state. In such case, then as represented by block 922, the controller may identify a mean and standard deviation for the current active Gaussian stream. For example, referring to FIG. 3, the controller may calculate the mean 304 of a probability distribution 302 based on the logical addresses previously identified within the current Gaussian stream, and the controller may calculate the standard deviation 306 based on the mean. Then, as represented by block 924, the controller may identify the category of the logical address within the current active stream. For instance, the controller may determine whether the logical address is within one, two, three, or more than three standard deviations from the calculated mean, in which case the controller may identify the category to be stream category 1, 2, 3, or outlier, respectively. If, as represented by block 926, the controller determines that the logical address is an outlier, then the controller may return the corresponding stream category (e.g. outlier) at block 916. Otherwise, the controller may return the identified stream category (e.g. stream category 1, 2, or 3) at block 916.

Figure 10:
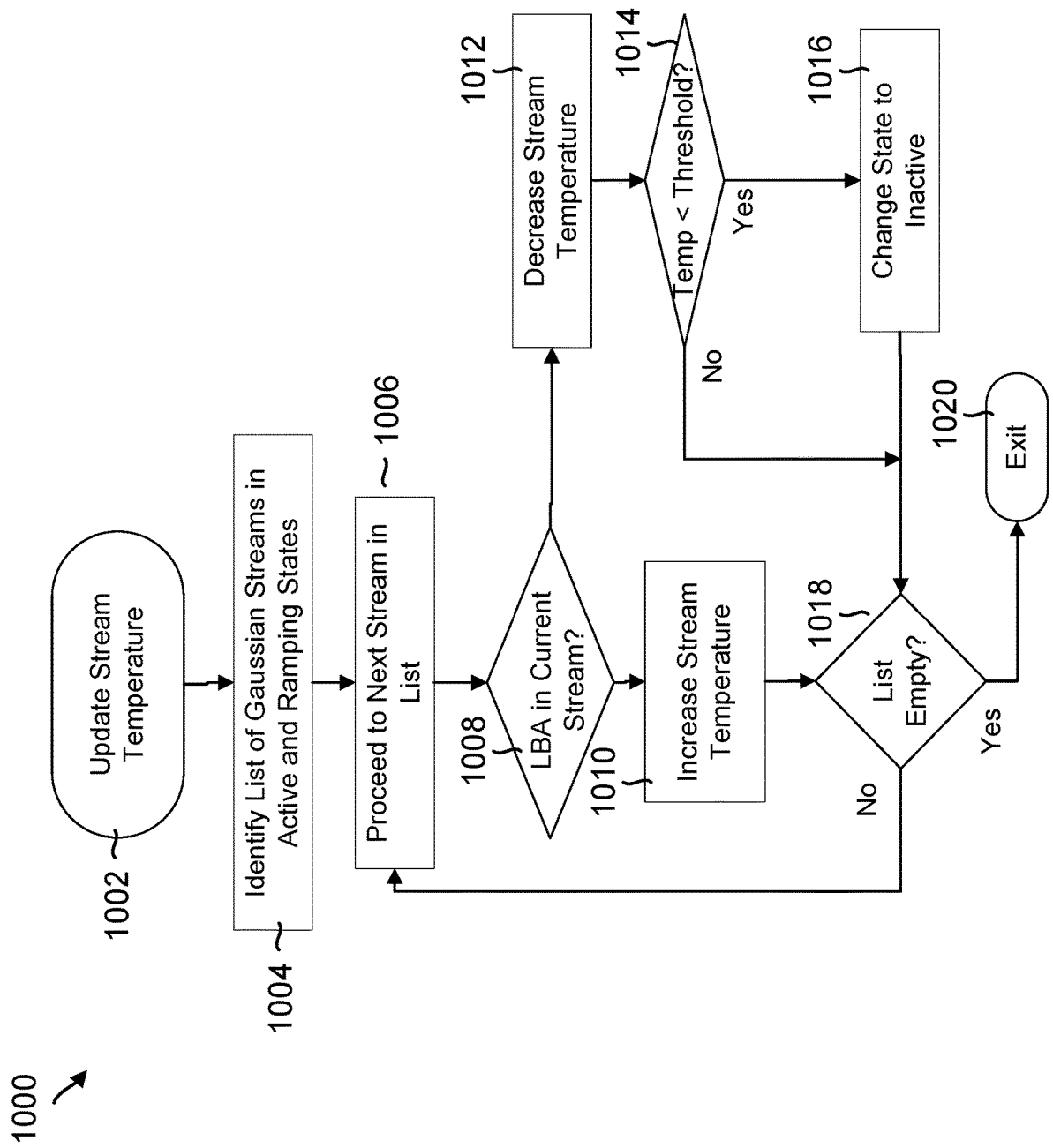
FIG. 10 is a flow chart illustrating a method for updating a temperature of a Gaussian stream during the storage process of FIG. 8.

FIG. 10 illustrates an example flow chart 1000 of a method for updating a temperature of a Gaussian stream. For example, the method can be carried out in a storage device 102 such as the one illustrated in FIG. 1. Each of the steps in the flow chart can be controlled using the controller as described below (e.g. controller 123), or by some other suitable means. As represented by block 1002, controller may update a temperature (hit count) of one or more Gaussian streams as described below, which may begin, for example, at block 819 of the storage process of FIG. 8.

As represented by block 1004, the controller may identify a list of Gaussian streams in the active and ramping states, and as represented by block 1006, the controller may process each Gaussian stream in the list of active and ramping streams. Accordingly, as represented by block 1008, the controller may determine whether the received logical address is within the current Gaussian stream in the list of active and ramping streams. If the received logical address falls within the current Gaussian stream (e.g. it is categorized as stream category 1, 2, or 3 for that stream), then as represented by block 1010, the controller may increase the temperature of the current Gaussian stream. Otherwise, if the received logical address is not within the current Gaussian stream in the list (e.g. it is categorized as an outlier for that stream), then as represented by block 1012, the controller may decrease the temperature of the current Gaussian stream. The controller may also determine, as represented by block 1014, whether the temperature of the current Gaussian stream has decreased below a temperature threshold (e.g. a threshold hit count for that stream), in which case, as represented by block 1016, the controller may change the state of the current Gaussian stream to the inactive state. Afterwards, as represented by block 1018, the controller may determine whether the current Gaussian stream is the last stream in the list of active and ramping streams, or if there are others to consider. If the current Gaussian stream is not the last stream (i.e. the list is not empty), then the controller may repeat the process described above by processing the next Gaussian stream at block 1006. Otherwise, if the list is empty, the controller may determine that the temperature updating process is complete, as represented by block 1020.

Accordingly, the storage device described in the present disclosure optimizes cache management by loading the most probable GAT pages in the cache. The cache management process described above may scale with multiple, localized probability distributions over large LBA spaces, where each probability distribution follows a Gaussian pattern of distribution. Computation overhead in GAT cache processing for page loads and evictions may be reduced by allowing for prediction of LBA regions which are less likely to occur in a received random pattern and by loading the GAT pages including these infrequent LBA regions in a scratchpad buffer. As a result, data throughput of the storage device may be improved and CPU cycles of the controller may be released for improved storage device performance.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   a cache configured to store a plurality of global address table (GAT) pages;
   a scratchpad buffer separate from the cache;
   a controller configured to receive a random pattern of logical addresses; and
   the controller configured to, in response to a miss in the cache, for one of the logical addresses of the random pattern, store a GAT page including the one of the logical addresses in the cache or the scratchpad buffer;
   wherein the controller is configured to store the GAT page in a partition of the cache, in response to determining, within a probability distribution, that the one of the logical addresses is within one standard deviation from a mean associated with the probability distribution; and
   wherein the controller is configured to store the GAT page in the scratchpad buffer in response to determining, within the probability distribution, that the one of the logical addresses is outside of the one standard deviation from the mean.

2. The storage device of claim 1, wherein the controller is further configured to identify a second one of the logical addresses of the random pattern within a second probability distribution, and to store a second GAT page including the second one of the logical addresses within a second partition of the cache, the second partition being associated with the second probability distribution.

3. The storage device of claim 2, wherein the controller is further configured to identify the second one of the logical addresses as being within the second probability distribution in response to the second one of the logical addresses being outside the probability distribution.

4. The storage device of claim 2,
   wherein the controller is further configured to increase a temperature associated with the probability distribution in response to the one of the logical addresses being within the probability distribution, and
   wherein the controller is further configured to decrease the temperature associated with the probability distribution in response to the second one of the logical addresses being identified as being within the second probability distribution.

5. The storage device of claim 1, wherein the controller is further configured to identify a second one of the logical addresses of the random pattern outside the probability distribution, and to store a second GAT page including the second one of the logical addresses within the scratchpad buffer.

6. The storage device of claim 1,
wherein the controller is further configured to store the GAT page in the partition or the scratchpad buffer based on whether the cache is full in response to the one of the logical addresses being within two standard deviations from the mean but not within the one standard deviation from the mean; and
wherein the controller is further configured to store the GAT page in the scratchpad buffer in response to the one of the logical addresses being within at least three standard deviations from the mean but not within the two standard deviations from the mean.

7. The storage device of claim 1, wherein the controller is further configured to dynamically change a size of the partition based on a range of the probability distribution.

8. The storage device of claim 1, wherein the controller is further configured to identify a state of the probability distribution as corresponding to one of an inactive state, a ramping state, or an active state.

9. The storage device of claim 8,
wherein the controller is further configured to transition the state from the ramping state to the active state in response to a number of logical addresses having been identified as being within the probability distribution; and
wherein the controller is further configured to transition the state from the active state to the inactive state in response to a temperature associated with the probability distribution having decreased below a threshold.

10. A storage device, comprising:
a cache configured to store a plurality of GAT pages;
a scratchpad buffer separate from the cache; and
a controller configured to receive a random pattern of logical addresses;
the controller configured to, in response to a first miss in the cache, for a first logical address of the logical addresses of the random pattern, store a first GAT page including the first logical address in the cache;
the controller configured to, in response to a second miss in the cache, for a second logical address of the logical addresses of the random pattern, store a second GAT page including the second logical address in the cache or the scratchpad buffer;
wherein the controller is configured to store the first GAT page in a first partition of the cache in response to determining, within a first probability distribution, that the first logical address is within one first standard deviation from a first mean associated with the first probability distribution;
wherein the controller is configured to store the second GAT page in a second partition of the cache in response to determining, within a second probability distribution, that the second logical address is within one second standard deviation from a second mean associated with the second probability distribution; and
wherein the controller is configured to store the second GAT page in the scratchpad buffer in response to determining, within the second probability distribution, that the second logical address is outside of the one second standard deviation from the second mean.

11. The storage device of claim 10,
wherein the controller is further configured to increase a temperature associated with the first probability distribution in response to the first logical address being within the first probability distribution, and
wherein the controller is further configured to decrease the temperature associated with the first probability distribution in response to the second logical address being within the second probability distribution.

12. The storage device of claim 10, wherein the controller is further configured to identify a third one of the logical addresses of the random pattern outside the first probability distribution and the second probability distribution, and to store a third GAT page including the third one of the logical addresses within the scratchpad buffer.

13. The storage device of claim 10, wherein the controller is further configured to dynamically change a first size of the first partition based on a first range of the first probability distribution and to dynamically change a second size of the second partition based on a second range of the second probability distribution.

14. The storage device of claim 10, wherein the controller is further configured to identify a state of each of the first probability distribution and the second probability distribution as corresponding to one of an inactive state, a ramping state, or an active state.

15. A storage device, comprising:
a cache configured to store a plurality of global address table (GAT) pages;
a scratchpad buffer separate from the cache; and
a controller configured to receive a random pattern of logical addresses;
the controller configured to, in response to a first miss in the cache for a first logical address of the logical addresses of the random pattern, store a first GAT page including the first logical address in the cache or the scratchpad buffer;
the controller configured to, in response to a second miss in the cache for a second logical address of the logical addresses of the random pattern, store a second GAT page including the second logical address in the cache or the scratchpad buffer;
the controller configured to, in response to a third miss in the cache, for a third logical address of the logical addresses of the random pattern, store a third GAT page including the third logical address in the scratchpad buffer;
wherein the controller is configured to store the first GAT page in a first partition of the cache in response to determining, within a first probability distribution, that the first logical address is within one first standard deviation from a first mean associated with the first probability distribution;
wherein the controller is configured to store the second GAT page in a second partition of the cache in response to determining, within a second probability distribution, that the second logical address is within one second standard deviation from a second mean associated with the second probability distribution; and
wherein the controller is configured to store the first GAT page in the scratchpad buffer in response to determining, within the first probability distribution, that the first logical address is outside of the one first standard deviation from the first mean;
wherein the controller is configured to store the second GAT page in the scratchpad buffer in response to determining, within the second probability distribution, that the second logical address is outside of the one second standard deviation from the second mean; and wherein the controller is configured to store the third GAT page in the scratchpad buffer in response to determining that the third logical address is outside of the first probability distribution and the second probability distribution.

16. The storage device of claim 15,
wherein the controller is further configured to increase a temperature associated with the first probability distribution in response to the first logical address being within the first probability distribution, and
wherein the controller is further configured to decrease the temperature associated with the first probability distribution in response to the second logical address being within the second probability distribution and in response to the third logical address being outside the first probability distribution and the second probability distribution.

17. The storage device of claim 15, wherein the controller is further configured to dynamically change a first size of the first partition based on a first range of the first probability distribution and to dynamically change a second size of the second partition based on a second range of the second probability distribution.

* * * * *